United States Patent
Sen et al.

(10) Patent No.: US 9,965,343 B2
(45) Date of Patent: May 8, 2018

(54) SYSTEM AND METHOD FOR DETERMINING CONCURRENCY FACTORS FOR DISPATCH SIZE OF PARALLEL PROCESSOR KERNELS

(71) Applicant: Advanced Micro Devices, Inc., Sunnyvale, CA (US)

(72) Inventors: Rathijit Sen, Austin, TX (US); Indrani Paul, Austin, TX (US); Wei Huang, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days. days.

(21) Appl. No.: 14/710,879

(22) Filed: May 13, 2015

(65) Prior Publication Data

US 2016/0335143 A1    Nov. 17, 2016

(51) Int. Cl.
*G06F 9/54*   (2006.01)
*G06F 9/445*   (2018.01)

(52) U.S. Cl.
CPC .......... *G06F 9/545* (2013.01); *G06F 9/44505* (2013.01); *Y02B 60/185* (2013.01)

(58) Field of Classification Search
None
See application file for complete search history.

(56) References Cited

U.S. PATENT DOCUMENTS

| | | | | |
|---|---|---|---|---|
| 2002/0116357 A1* | 8/2002 | Paulley | ............. | G06F 17/30466 |
| 2011/0022817 A1* | 1/2011 | Gaster | .................. | G06F 9/5044 711/202 |
| 2011/0161734 A1* | 6/2011 | Alexander | .......... | G06F 11/0715 714/16 |
| 2012/0144162 A1 | 6/2012 | Papakipos et al. | | |
| 2012/0173847 A1* | 7/2012 | Moy | ..................... | G06F 9/3009 712/32 |
| 2012/0291040 A1* | 11/2012 | Breternitz | ............. | G06F 9/5083 718/104 |
| 2012/0320070 A1* | 12/2012 | Arvo | ..................... | G06F 9/5033 345/522 |
| 2012/0331278 A1 | 12/2012 | Breternitz et al. | | |

(Continued)

OTHER PUBLICATIONS

Gebhart, Mark, et al., "Energy-Efficient Mechanisms for Managing Thread Context in Throughput Processors", ISCA 2011, 12 pgs., Jun. 4-8, 2011, San Jose, California, USA, ACM 978-1-4503-0472-6/11/06.

(Continued)

*Primary Examiner* — Tuan Dao
(74) *Attorney, Agent, or Firm* — Volpe and Koenig, P.C.

(57) ABSTRACT

Disclosed is a method of determining concurrency factors for an application running on a parallel processor. Also disclosed is a system for implementing the method. In an embodiment, the method includes running at least a portion of the kernel as sequences of mini-kernels, each mini-kernel including a number of concurrently executing workgroups. The number of concurrently executing workgroups is defined as a concurrency factor of the mini-kernel. A performance measure is determined for each sequence of mini-kernels. From the sequences, a particular sequence is chosen that achieves a desired performance of the kernel, based on the performance measures. The kernel is executed with the particular sequence.

23 Claims, 4 Drawing Sheets

(56) References Cited

U.S. PATENT DOCUMENTS

| | | | |
|---|---|---|---|
| 2013/0160016 A1* | 6/2013 | Gummaraju | G06F 9/5044 |
| | | | 718/102 |
| 2014/0156971 A1 | 6/2014 | Kunze et al. | |
| 2014/0310507 A1* | 10/2014 | Nystad | G06F 9/44521 |
| | | | 713/1 |
| 2017/0249781 A1* | 8/2017 | Wald | G06T 17/005 |

OTHER PUBLICATIONS

Lee et al., "Transparent CPU-GPU Collaboration for Data-Parallel Kernels on Heterogeneous Systems," PACT '13 Proceedings of the 22nd International Conference 2013, 245-256 (ISBN: 978-1-4799-1021-2).

* cited by examiner

SYSTEM AND METHOD FOR DETERMINING CONCURRENCY FACTORS FOR DISPATCH SIZE OF PARALLEL PROCESSOR KERNELS

FIELD OF THE INVENTION

The present invention is generally directed to parallel processors, and in particular, to execution of applications on parallel processors.

BACKGROUND

Parallel processors, such as graphics processors, or graphics processing units (GPUs), are highly parallel computation devices. As the name implies, GPUs were originally developed for fast and efficient processing of visual information, such as video. More recently, however, they have been engineered to be more general-purpose massively parallel devices. Current GPUs may execute thousands of computations concurrently, and this number is bound to increase with time. Such parallel computations are referred to as threads. In order to reduce hardware complexity (and thus allow more parallel compute-units in a chip), GPUs bundle numerous threads together and require them to execute in a single-instruction-multiple-data (SIMD) fashion. That is, the same instructions are executed simultaneously on many distinct pieces of data. Such a bundle of threads is called a wavefront, a warp, or other names.

A kernel is a program, or a portion of a program, containing multiple threads, that executes on a computing device. The multiple threads may be bundled into one or more workgroups, which are also known as threadblocks and other names.

SUMMARY

Disclosed is a method of determining concurrency factors for a kernel in an application running on a parallel processor. Also disclosed is a system for implementing the method.

In an embodiment, the method includes running at least a portion of the kernel as sequences of mini-kernels, each mini-kernel comprising a number of concurrently executing workgroups, the number being defined as a concurrency factor of the mini-kernel; determining a performance measure for each sequence of mini-kernels; choosing from the sequences a particular sequence that achieves a desired performance of the kernel, based on the performance measures; and executing the kernel with the particular sequence.

BRIEF DESCRIPTION OF THE DRAWINGS

A more detailed understanding may be had from the following description, given by way of example in conjunction with the accompanying drawings wherein.

DETAILED DESCRIPTION

Figure 1:
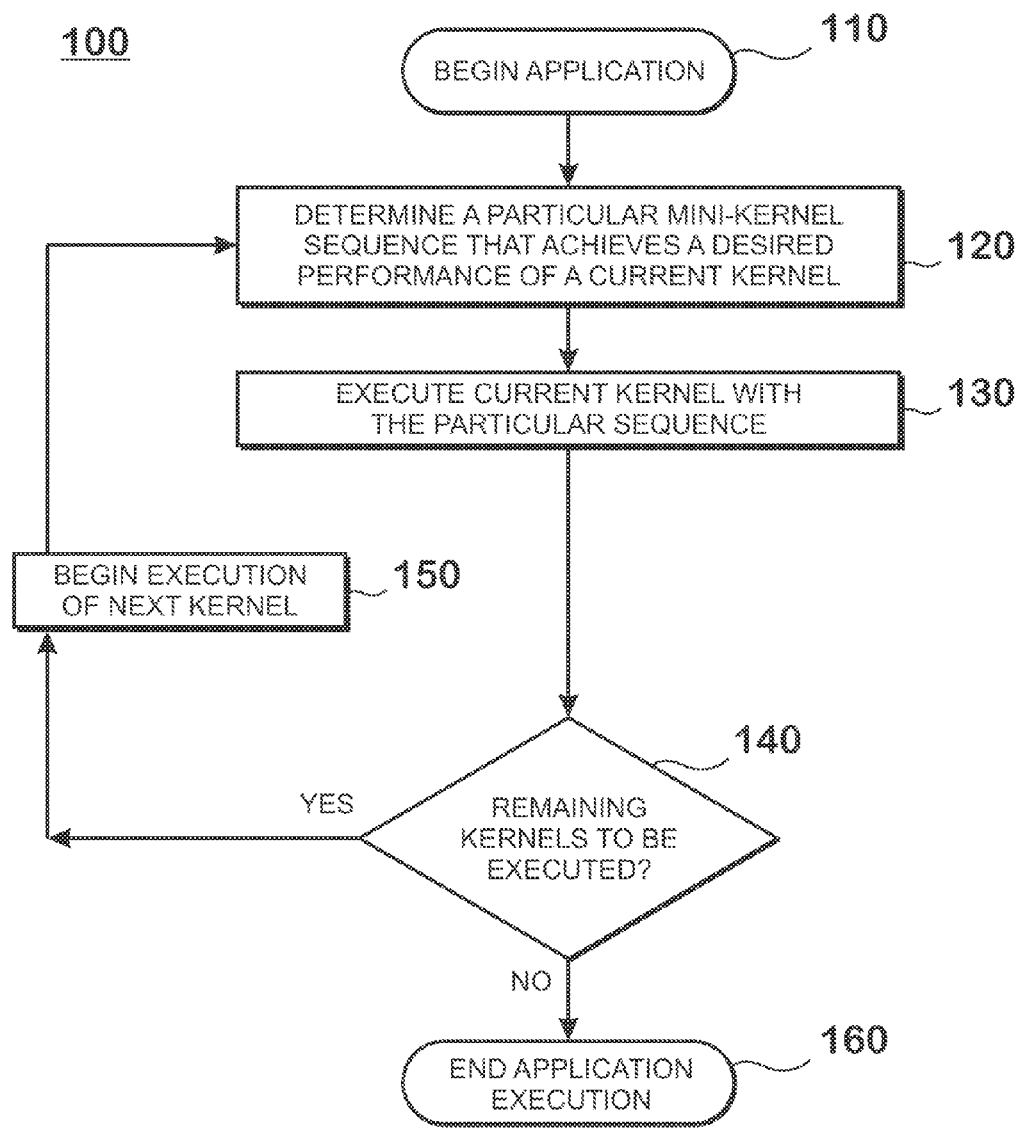
FIG. 1 shows an overview of a method of determining a concurrency factor for an application running on a parallel processor.

Kernels that are executed in parallel processors, such as graphics processing units (GPUs), include a number of workgroups. Workgroups are software elements of a kernel and can be executed concurrently and/or in series. These workgroups are often executed in a pre-determined order when the kernel is executed. The maximum number of workgroups dispatched concurrently may depend on register file resource limits and a maximum number of wavefronts per compute-unit (CU) limit. However this does not take into account application characteristics and requirements such as memory access rates and branch divergence. Executing as many workgroups concurrently as is allowed by a system's resources may not result in the best performance or best energy efficiency due to contention for limited resources, such as memory and control flow divergence.

Disclosed herein are a method and system for choosing numbers of workgroups to dispatch and execute concurrently to achieve a desired performance of an executing kernel. At least a portion of a current kernel in the application execution is run as sequences of mini-kernels. Each mini-kernel in a sequence includes a number of concurrently executing workgroups. The number of concurrently executing workgroups in a mini-kernel is defined as a concurrency factor of the mini-kernel. The mini-kernels are executed sequentially in each of the sequences of mini-kernels. As an example, not to be considered limiting, suppose a kernel has a total of 128 workgroups. The kernel could be run as 128 sequential mini-kernels, each mini-kernel containing one workgroup. Alternatively, the kernel could be run as 64 sequential mini-kernels, each mini-kernel containing two workgroups executing concurrently. Alternatively, the kernel could be run as 32 sequential mini-kernels, each mini-kernel containing four workgroups executing concurrently. Alternatively, the kernel could be run as one mini-kernel containing 128 workgroups executing concurrently. The latter alternative is the same as the execution of the kernel itself.

As defined above, the number of workgroups executing concurrently in a mini-kernel may be called a concurrency factor of that mini-kernel. Thus, for example, in a kernel in which 128 total workgroups are partitioned into 128 sequentially executed mini-kernels, each containing one workgroup, the concurrency factor of each mini-kernel is 1. In a kernel with a total of 128 workgroups partitioned into 32 sequentially executed mini-kernels each containing four workgroups, the concurrency factor of each mini-kernel is 4. And so on. Thus, in an embodiment, a kernel, or a portion of a kernel, can be run as sequences of mini-kernels, each mini-kernel in a given sequence having a common concurrency factor. Furthermore, a kernel, or a portion of a kernel, may be run repeatedly, each repetition being run as a sequence of mini-kernels with a common concurrency factor, the common concurrency factor changing with each repetition. As an example, not to be considered limiting, the common concurrency factor in each repetition could be a power of 2. Thus, for example, a kernel with 128 workgroups could be run as sequences of mini-kernels such that the common currency factor in one sequence is 1, in another 2, in another 4, and so on, with respective common concurrency factors for other sequences of 8, 16, 32, 64, and 128.

In each of the foregoing examples, each mini-kernel contains the same number of workgroups—i.e., all of the mini-kernels have a common concurrency factor—but this is not necessary and should not be considered limiting. Alternatively, a kernel may be partitioned into sequences of mini-kernels having varying numbers of workgroups, with the sum of the numbers of workgroups being the total number of workgroups in the kernel. For example, a kernel having a total of 128 workgroups could be run as three sequentially executed mini-kernels containing, respectively, 50 workgroups, 40 workgroups, and 38 workgroups. In other words, the kernel could be run as a sequence of three mini-kernels having respective concurrency factors 50, 40, and 38. Alternatively, the same kernel could be run as two sequentially executed mini-kernels containing, respectively, 92 workgroups and 36 workgroups. Thus, in an embodiment, a kernel, or a portion of a kernel, can be run repeatedly, each repetition being run as a sequence of mini-kernels having various concurrency factors. Given a total number of workgroups in a kernel and a concurrency factor for each mini-kernel in a sequence of mini-kernels, as described hereinbefore, there may still be many ways to construct such a mini-kernel. For example, not to be considered limiting, in the case of a 128-workgroup kernel run as 32 sequential mini-kernels each with concurrency factor 4, there is a large number of distinct ways to partition the 128 workgroups into 32 mini-kernels of 4 workgroups each. In an embodiment, all such possibilities may be tried. Alternatively a subset of the total number of possible partitions may be tried, the subset being chosen based on one or more additional criteria. As an example of such criteria, not to be considered limiting, the totality of workgroups in a kernel may be imagined to be distributed in an abstract mathematical space of one, two, three, or more dimensions. Each workgroup may be designated, or indexed, by a set of coordinates along axes of the space. To reduce the number of mini-kernel partitions to be tried out of all possibilities, the following additional criterion, or restriction, may be imposed: each mini-kernel may contain only workgroups that are contiguous, or adjacent, in the space. As one example, not to be considered limiting, consider a kernel containing 15 workgroups arranged in a one-dimensional space. The workgroups may be indexed with the numbers 1, 2, 3, . . . 15, and visualized as arrayed along a straight line—i.e. a single axis. Suppose it is desired to partition this kernel into four mini-kernels containing, respectively, three, six, two, and four workgroups. According to the additional criterion, the three-workgroup mini-kernel may contain workgroups indexed 1, 2, and 3. It may contain workgroups indexed 7, 8, and 9. It may not, however, contain workgroups indexed 1, 2, and 7 since these workgroups are not all contiguous. Similarly it may not contain workgroups 7, 8, and 11, or 7, 9, and 11. As another example, if an additional criterion is imposed that all mini-kernels must have the same number of workgroups, the number of possible partitions to try may become very small. For example, consider a one-dimensional kernel of 15 workgroups partitioned into three mini-kernels each having five workgroups, and in addition the workgroups in each mini-kernel must be contiguous. In this case there is only one partition satisfying all of the criteria: a mini-kernel containing workgroups 1-5, inclusive, another mini-kernel containing workgroups 6-10 inclusive, and a third mini-kernel containing workgroups 11-15 inclusive. These criteria may be easily generalized to kernels with workgroups arranged in higher dimensional abstract spaces.

Thus, a method for selecting one or more concurrency factors for a kernel in an application running on a parallel processor to achieve a desired performance may proceed as follows. The kernel, or at least a portion of kernel, may be run repeatedly. Each repetition may be run as a distinct sequence of mini-kernels, each mini-kernel having a concurrency factor that indicates a number of concurrently executing workgroups. For each such sequence of mini-kernels a performance measure may be determined. Based on the performance measures, a particular sequence is chosen that achieves a desired performance of the kernel. The kernel is executed with the particular sequence of mini-kernels. These method elements are described in detail hereinafter, with the aid of FIGS. 1 through 4.

FIG. 1 is an overview of an embodiment of a method of determining concurrency factors for an application running on a parallel processor such as a GPU. The method begins at 110. As each kernel of the application is executed, a particular sequence of mini-kernels is determined for that current kernel 120, as described below, for example. That current kernel is executed with the determined particular sequence of mini-kernels 130. Once execution of this current kernel is completed, a check is performed to determine whether or not there are remaining kernels to be executed to complete execution of the application 140. If there are remaining kernels to be executed, a new application kernel is invoked and its execution begins 150. The method returns to 120 and a new particular sequence of mini-kernels is determined for this next kernel.

The loop between 120-130-140-150-120 repeats until the check at 140 reveals no remaining kernels to be executed. In that case, execution of the application ends 160. A result of the application execution may be provided to a user by an output device, which may include, for example a visual display device.

Figure 2:
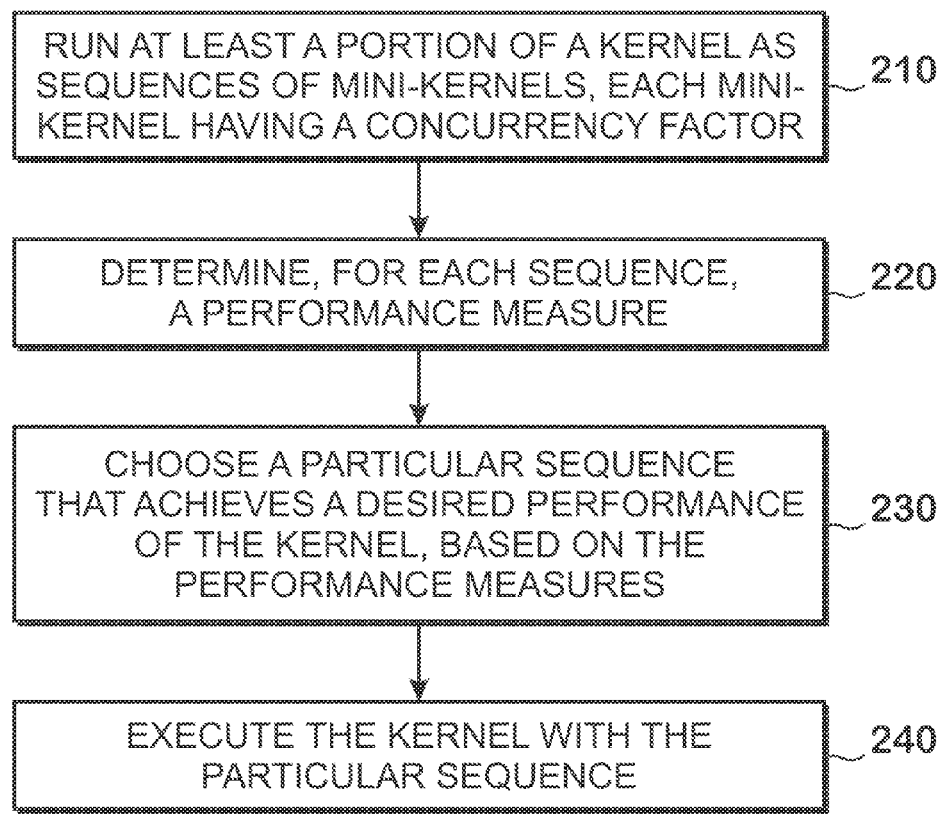
FIG. 2 shows details of an embodiment of the method of FIG. 1.

FIG. 2 shows details of an embodiment of a method of determining a particular sequence of mini-kernels for a kernel. A current kernel in the application execution, or at least a portion of the kernel, is run as sequences of mini-kernels, each mini-kernel having a concurrency factor 210. In general, the concurrency factor of each mini-kernel may be independent of the concurrency factor of all other mini-kernels.

For each sequence, a performance measure, which in some implementations may be based on a combination of performance measures, is determined 220. Non limiting examples of performance measures include at least one of an execution time, such as a kernel execution time or an application execution time; a temperature; an energy dissipation rate; a power efficiency; an energy efficiency; reliability, as measured by, for example, a soft error rate; a measure of contention for resources, such as memory; or a compute-unit sensitivity. Compute-unit sensitivity may be defined as a change in a performance measure divided by a corresponding change in a number of compute-units executing. Compute unit sensitivity may be determined based on at least one of: compute behavior, memory behavior, one or more runtime statistics, or number of workgroups executing. As one non-limiting example, compute-unit sensitivity may be modelled as a linear function of at least one of compute behavior, memory behavior, one or more runtime statistics, or number of workgroups executing. Coefficients in this linear function may be constants determined by a regression model on performance statistics and compute-unit sensitivity for known kernels. The predicted compute-unit sensitivity may be compared against thresholds to determine if concurrency is HIGH, MEDIUM or LOW. Depending on this classification, a maximum number of workgroups to execute concurrently can be determined. In variations, other concurrency categories are possible.

Continuing with FIG. 2, once all desired sequences of mini-kernels are run and their performance measures obtained, a particular sequence is chosen that achieves a desired performance of the kernel, based on the performance measures of all the tried sequences 230. The kernel is executed with the particular sequence 240. Examples of achieving a desired performance, not to be construed as limiting, include one or more of minimizing an execution time, such as a kernel execution time or an application execution time; maintaining a processor, or a system containing a processor, within a thermal limit, such as limiting a temperature or an energy dissipation rate; maximizing reliability of a processor or a system containing a processor; maximizing an energy efficiency and maximizing a power efficiency. Maximizing reliability may include minimizing a rate of occurrence of soft errors. Another example of achieving a desired performance includes minimizing contention among workgroups for use of a memory, such as a cache memory. As a further example, any subset of the aforementioned examples achieved simultaneously may be selected as achieving a desired performance.

Figure 3A:
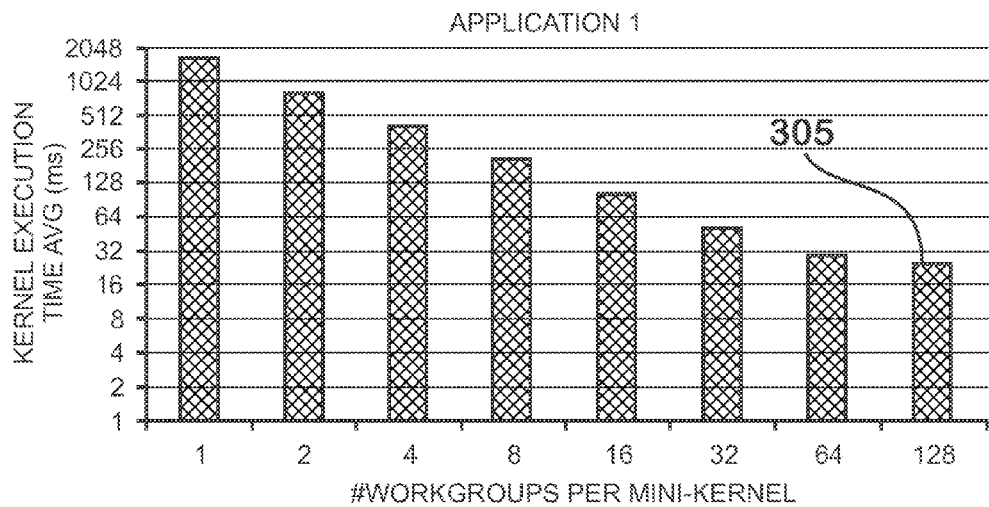
FIGS. 3A and 3B show observed results for two different applications, respectively.
Figure 3B:
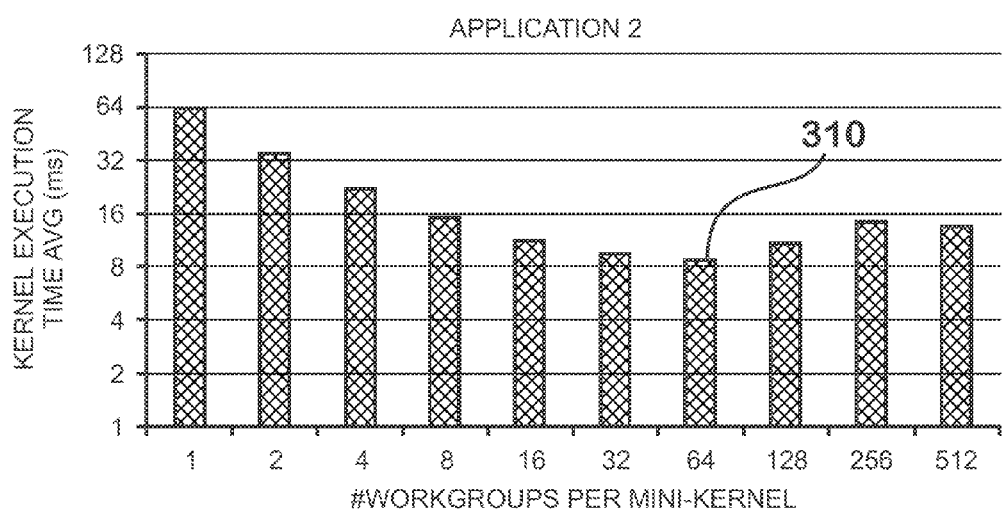

FIGS. 3A and 3B respectively show two examples, not to be construed as limiting, of determining concurrency factors for a kernel of an application running on a parallel processor. The results shown here are actual experimental results obtained by running two different applications on a GPU. FIG. 3A shows results for one application, labeled Application 1, while FIG. 3B shows similar results for a different application, labeled Application 2. In both FIGS. 3A and 3B, at least a portion of a kernel of the respective application is run as sequences of mini-kernels in which the mini-kernels in each sequence all have the same number of workgroups, i.e. the same concurrency factor. The height of each vertical bar along the vertical axes indicates a performance measure—in this example a kernel execution time—obtained with a sequence having a common concurrency factor indicated by the corresponding number on the horizontal axes. In these examples, achieving a desired performance includes minimizing a kernel execution time.

The variation of performance measure with different common concurrency factors is different for the two applications shown in FIGS. 3A and 3B. In the example of FIG. 3A, a minimum kernel execution time, a desired performance, is obtained when a common concurrency factor is at a maximum examined value, namely 128, as indicated at 305. By contrast, in FIG. 3B, a desired performance is obtained with a concurrency factor of 64, as indicated at 310. In this case, desired performance is obtained with a concurrency factor less than the maximum examined concurrency factor of 512. A possible explanation for this, not to be construed as limiting, is as follows. As the concurrency factor increases from 1, the execution time decreases due to the increasing number of workgroups running concurrently. At the same time, as the number of concurrently running workgroups increases, contention among these workgroups for resources, such as memory, increases. This contention tends to increase execution time. Once the number of concurrently executing workgroups is greater than some number, such as 64 in this example, the effect of contention dominates the effect of concurrency, and execution time increases with increasing concurrency factor.

Returning to FIG. 2, in the example shown there, a particular mini-kernel sequence that achieves a desired performance may be determined with every kernel invocation during the running of the application, as the application's parallelism demands change over time. This may be achieved by performing the running of at least a portion of the kernel 210, the determining of a performance measure 220, the choosing of a particular sequence that achieves a desired performance 230, and the executing of the kernel with the particular sequence 240, all of these performed whenever a new application kernel is invoked during the running of the application. As non-limiting examples, this would be the case for a graph algorithm or irregular application.

The chosen particular sequence may remain constant during execution of the kernel. An alternative embodiment may include performing the running of at least a portion of the kernel 210, the determining 220, the choosing 230, and the executing 240, all performed dynamically during the executing of a kernel, in response to a changing computational environment. As non-limiting examples, the chosen particular mini-kernel sequence used as execution of a kernel could be changed during kernel execution based on performance statistics and kernel phase changes.

Figure 4:
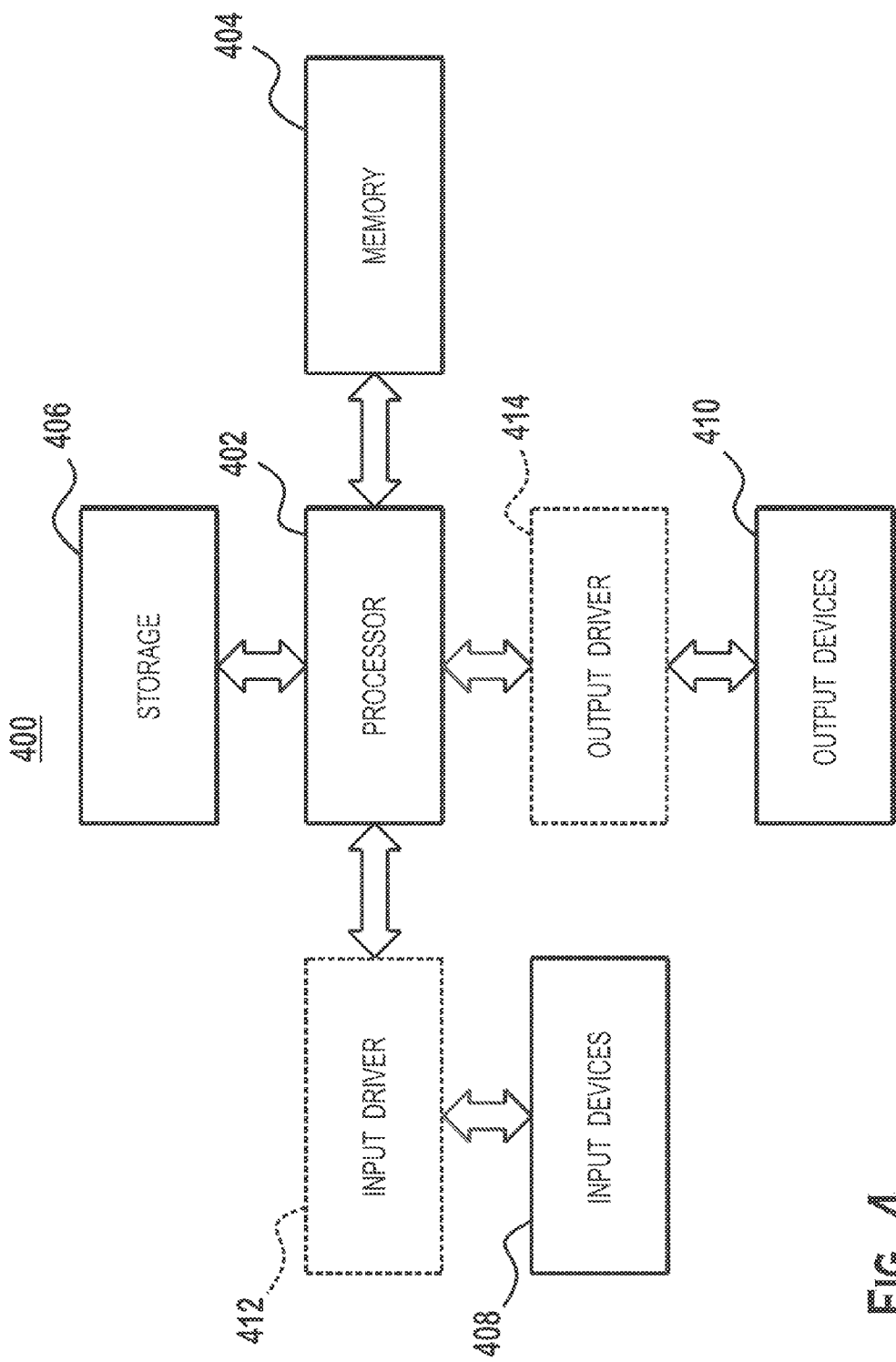
FIG. 4 is a block diagram of an example system in which one or more disclosed embodiments may be implemented.

FIG. 4 is a block diagram of an example device or system 400 in which one or more disclosed embodiments may be implemented. System 400 may include, for example, a computer, a gaming device, a handheld device, a set-top box, a television, a mobile phone, or a tablet computer. System 400 includes a processor 402; a memory 404; a storage 406; one or more input devices 408; and one or more output devices 410, configured to provide a result of the execution of the application. Output devices 410 may include a visual display. System 400 may also optionally include an input driver 412 and an output driver 414. It is understood that system 400 may include additional components not shown in FIG. 4.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache.

The storage 406 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 may include a display, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the device 400 will operate in the same manner if the input driver 412 and the output driver 414 are not present.

System 400 may be configured to determine concurrency factors for a kernel in an application by implementing one or more embodiments of a method described hereinbefore. Parallel processor 402 may be configured to execute the application as one or more kernels. Memory 404 or storage 406 may be configured to exchange information with parallel processor 402, to store the application, and to load the application into the parallel processor 402. Parallel processor 402 may be configured to run at least a portion of the kernel as sequences of mini-kernels, each mini-kernel comprising a number of concurrently executing workgroups, the number being defined as a concurrency factor of the mini-kernel; determine a performance measure for each sequence of mini-kernels; choose from the sequences a particular sequence that achieves a desired performance of the kernel, based on the performance measures; and execute the kernel with the particular sequence.

Parallel processor 402 may be configured to perform the aforementioned running of at least a portion of the kernel, determining, choosing, and executing whenever a new application kernel is invoked during the running of the application. Parallel processor 402 may be configured to perform the running of at least a portion of the kernel, the determining, the choosing, and the executing dynamically during the running of the application.

Parallel processor 402 may be configured to choose a particular sequence that achieves a desired performance of the kernel by at least one of: minimizing an execution time, maintaining the system within a thermal limit, maximizing at least one of a power efficiency or an energy efficiency, maximizing reliability of the system, and minimizing contention among workgroups for use of the first memory or for use of the second memory or for use of both memories.

Parallel processor 402 may be configured to determine a compute-unit sensitivity as the performance measure. Parallel processor 402 may be configured to determine the compute-unit sensitivity based on at least one of compute behavior, memory behavior, one or more runtime statistics, or number of workgroups executing. Parallel processor 402 may be configured to determine a compute-unit sensitivity as a linear function of at least one of compute behavior, memory behavior, one or more runtime statistics, or number of workgroups executing.

Parallel processor 402 may be configured to run at least a portion of the kernel as sequences of mini-kernels comprising concurrently executing workgroups that are contiguous. Parallel processor 402 may be configured to run at least a portion of the kernel as sequences of mini-kernels, wherein all mini-kernels in at least one of the sequences have a common concurrency factor. The common concurrency factor may be a power of 2.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of determining concurrency factors for a kernel comprising workgroups in an application running on a parallel processor, the method comprising:
   partitioning the workgroups into mini-kernels, each mini-kernel including a number of the workgroups that are executing concurrently, the number being a concurrency factor of the mini-kernel, the concurrency factor of at least one of the mini-kernels being greater than one;
   the parallel processor running at least a portion of the kernel as sequences of the mini-kernels;
   determining a performance measure for each sequence of mini-kernels;
   choosing from the sequences a particular sequence that achieves a desired performance of the kernel, based on the performance measures; and
   the parallel processor executing the kernel with the particular sequence.

2. The method of claim 1, wherein all concurrently executing workgroups in a mini-kernel are contiguous.

3. The method of claim 1, wherein all mini-kernels in at least one of the sequences have a common concurrency factor.

4. The method of claim 3, wherein the common concurrency factor is a power of 2.

5. The method of claim 1, further comprising performing the running of at least a portion of the kernel, the determining, the choosing, and the executing whenever a new application kernel is invoked during the running of the application.

6. The method of claim 1, further comprising performing the running of at least a portion of the kernel, the determining, the choosing, and the executing dynamically during the running of the application.

7. The method of claim 1, wherein the achieving a desired performance comprises at least one of: minimizing an execution time, maintaining the parallel processor within a thermal limit, maximizing at least one of a power efficiency or an energy efficiency, maximizing reliability of the parallel processor or of a system including the parallel processor, and minimizing contention among workgroups for use of a memory.

8. The method of claim 1, wherein the performance measure comprises a compute-unit sensitivity.

9. The method of claim 8, wherein the compute-unit sensitivity is determined based on at least one of compute behavior, memory behavior, one or more runtime statistics, or number of workgroups executing.

10. The method of claim 8, wherein the compute-unit sensitivity is modeled as a linear function of at least one of compute behavior, memory behavior, one or more runtime statistics, or number of workgroups executing.

11. The method of claim 1, further comprising providing a result of the running of the application to a display device that displays the result.

12. A system configured to determine concurrency factors for a kernel comprising workgroups in an application, the system comprising:
   a parallel processor configured to execute the application;

a first memory configured to exchange information with the parallel processor, to store the application, and to load the application into the parallel processor; and a second memory configured to exchange information with the parallel processor;

wherein the parallel processor is further configured to:

partition the workgroups into mini-kernels, each mini-kernel including a number of the workgroups that are executing concurrently, the number being a concurrency factor of that mini-kernel, the concurrency factor of at least one of the mini-kernels being greater than one;

run at least a portion of the kernel as sequences of the mini-kernels;

determine a performance measure for each sequence of mini-kernels;

choose from the sequences a particular sequence that achieves a desired performance of the kernel, based on the performance measures; and execute the kernel with the particular sequence.

13. The system of claim 12, further comprising an output device configured to provide a result of the execution of the application.

14. The system of claim 13, wherein the output device comprises a visual display.

15. The system of claim 12, wherein the parallel processor is configured to perform the running of at least a portion of the kernel, the determining, the choosing, and the executing whenever a new application kernel is invoked during the running of the application.

16. The system of claim 12, wherein the parallel processor is configured to perform the running of at least a portion of the kernel, the determining, the choosing, and the executing dynamically during the running of the application.

17. The system of claim 12, wherein the parallel processor is configured to choose a particular sequence that achieves a desired performance of the kernel by at least one of: minimizing an execution time, maintaining the system within a thermal limit, maximizing at least one of a power efficiency or an energy efficiency, maximizing reliability of the system, and minimizing contention among workgroups for use of the first memory or for use of the second memory or for use of both memories.

18. The system of claim 12, wherein the parallel processor is configured to determine a compute-unit sensitivity as the performance measure.

19. The system of claim 18, wherein the parallel processor is configured to determine the compute-unit sensitivity based on at least one of compute behavior, memory behavior, one or more runtime statistics, or number of workgroups executing.

20. The system of claim 18, wherein the parallel processor is configured to determine the compute-unit sensitivity as a linear function of at least one of compute behavior, memory behavior, one or more runtime statistics, or number of workgroups executing.

21. The system of claim 12, wherein the parallel processor is configured to run at least a portion of the kernel as sequences of mini-kernels comprising concurrently executing workgroups that are contiguous.

22. The system of claim 12, wherein the parallel processor is configured to run at least a portion of the kernel as sequences of mini-kernels, wherein all mini-kernels in at least one of the sequences have a common concurrency factor.

23. The system of claim 22, wherein the common concurrency factor is a power of 2.

* * * * *